United States Patent
Bae

(10) Patent No.: US 9,793,747 B2
(45) Date of Patent: Oct. 17, 2017

(54) WIRELESS POWER RECEIVING DEVICE AND POWER CONTROL METHOD THEREOF

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 171 days.

(21) Appl. No.: 14/441,791

(22) PCT Filed: Nov. 6, 2013

(86) PCT No.: PCT/KR2013/010033
§ 371 (c)(1),
(2) Date: May 8, 2015

(87) PCT Pub. No.: WO2014/073863
PCT Pub. Date: May 15, 2014

(65) Prior Publication Data
US 2015/0295450 A1    Oct. 15, 2015

(30) Foreign Application Priority Data
Nov. 9, 2012    (KR) ........................ 10-2012-0126956

(51) Int. Cl.
| | | |
|---|---|---|
| *H02J 7/00* | (2006.01) | |
| *H02J 7/04* | (2006.01) | |
| *H02J 5/00* | (2016.01) | |
| *H02J 7/02* | (2016.01) | |
| *H02J 50/12* | (2016.01) | |

(52) U.S. Cl.
CPC .............. *H02J 7/042* (2013.01); *H02J 5/005* (2013.01); *H02J 7/0052* (2013.01); *H02J 7/025* (2013.01); *H02J 50/12* (2016.02); *H02J 2007/0059* (2013.01)

(58) Field of Classification Search
CPC .......... H02J 7/042; H02J 50/12; H02J 7/0052; H02J 5/005; H02J 7/025; H02J 2007/0059
See application file for complete search history.

(56) References Cited

U.S. PATENT DOCUMENTS

| | | |
|---|---|---|
| 5,293,308 A | 3/1994 | Boys et al. |
| 2005/0133497 A1 | 6/2005 | Makoto |
| | (Continued) | |

FOREIGN PATENT DOCUMENTS

| | | |
|---|---|---|
| CN | 101340113 A | 1/2009 |
| JP | 2011-182538 A | 9/2011 |
| | (Continued) | |

*Primary Examiner* — Nha Nguyen
(74) *Attorney, Agent, or Firm* — Birch, Stewart, Kolasch & Birch, LLP

(57) ABSTRACT

Disclosed is a wireless power receiver and a power control method thereof. The wireless power receiver includes a reception unit to receive power from the wireless power transmitter by using a resonance scheme; a load management unit to control an impedance of the load according to a state of the load; and a rectifying unit disposed between the reception unit and the load management unit in order to rectify the received power, wherein the power transmitted from the wireless power transmitter is controlled by the controlled impedance.

13 Claims, 6 Drawing Sheets

(56) References Cited

U.S. PATENT DOCUMENTS

| | | | | |
|---|---|---|---|---|
| 2009/0021219 A1* | 1/2009 | Yoda | ........................ | H02J 7/025 |
| | | | | 320/137 |
| 2011/0013432 A1* | 1/2011 | Wagoner | ................. | H02J 3/383 |
| | | | | 363/95 |
| 2011/0241440 A1 | 10/2011 | Sakoda et al. | | |
| 2013/0015813 A1* | 1/2013 | Kim | ......................... | H02J 7/00 |
| | | | | 320/108 |
| 2013/0154386 A1 | 6/2013 | Bae | | |
| 2013/0229062 A1 | 9/2013 | Bae | | |

FOREIGN PATENT DOCUMENTS

| | | |
|---|---|---|
| JP | 2011-193619 A | 9/2011 |
| KR | 10-2009-0008158 A | 1/2009 |
| KR | 10-2011-0081886 A | 7/2011 |

\* cited by examiner

[Fig. 1]
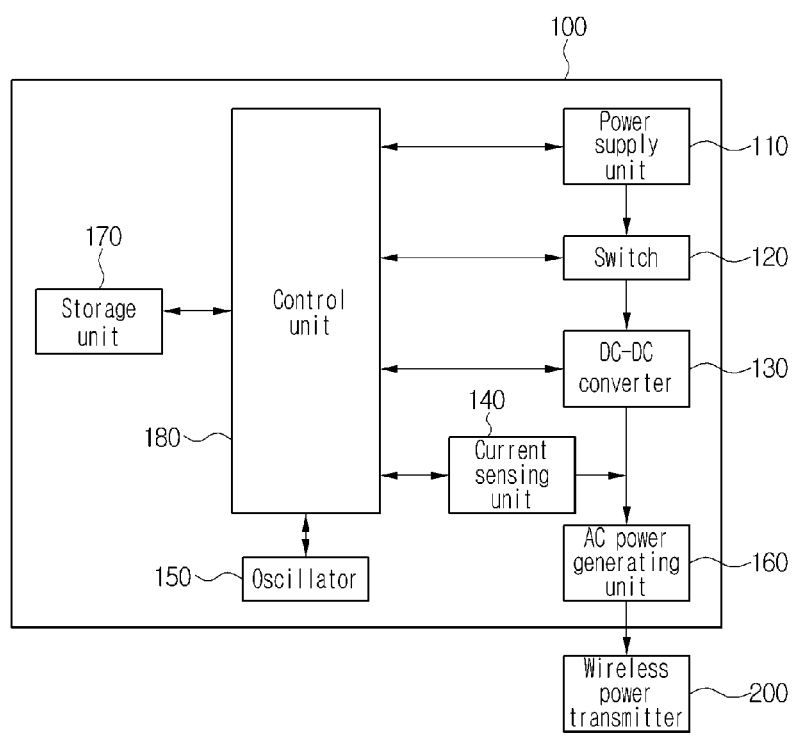

[Fig. 2]
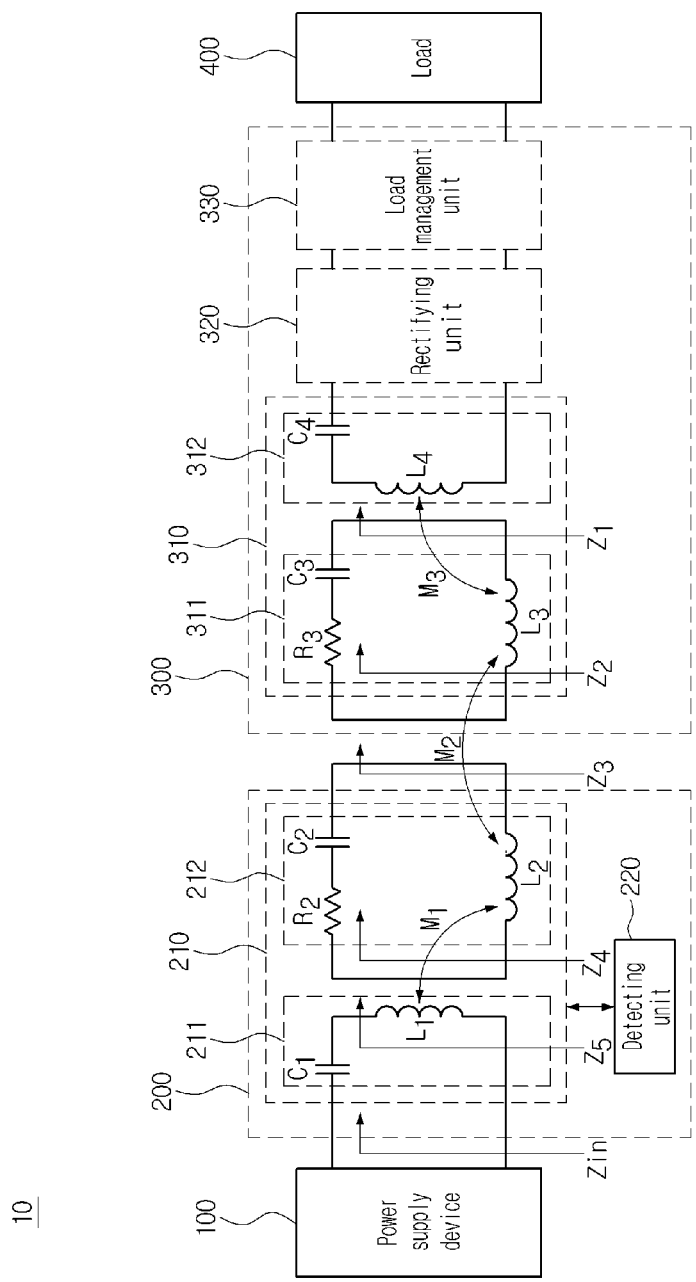

[Fig. 3]
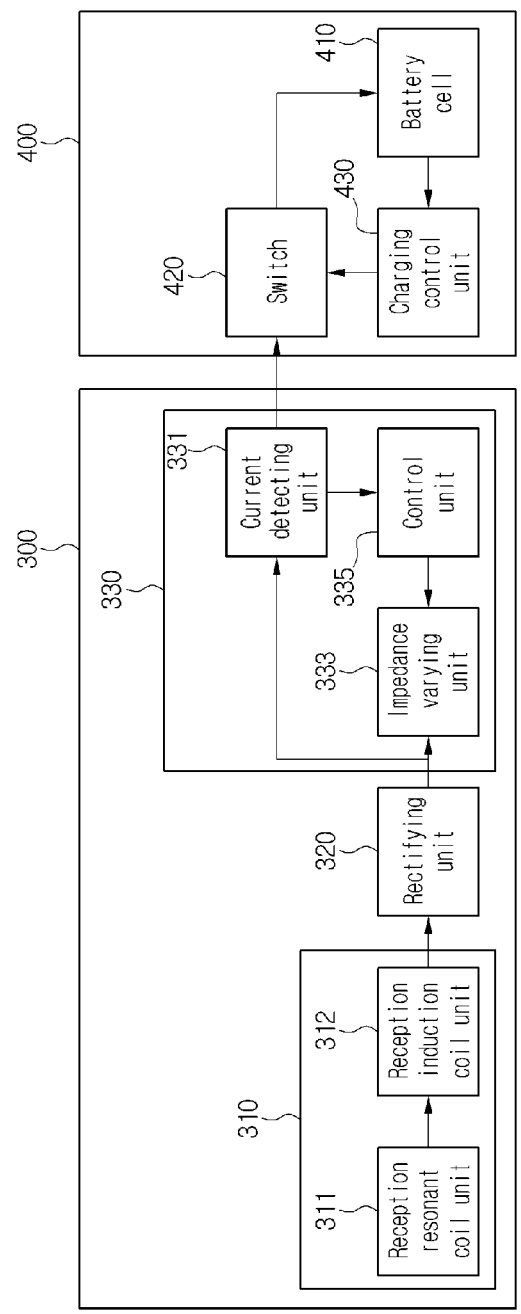

[Fig. 4]
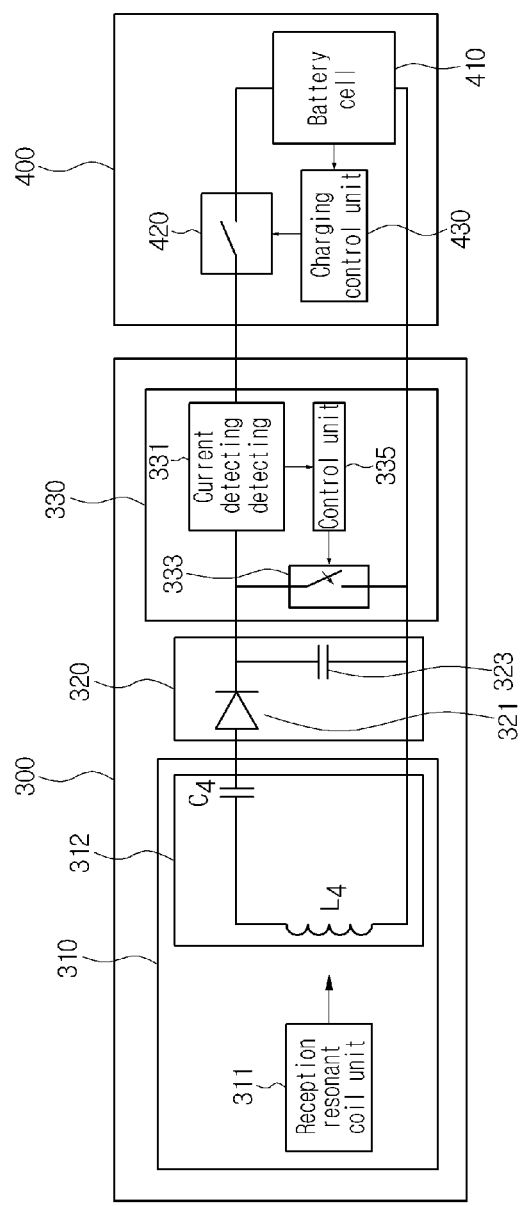

[Fig. 5]
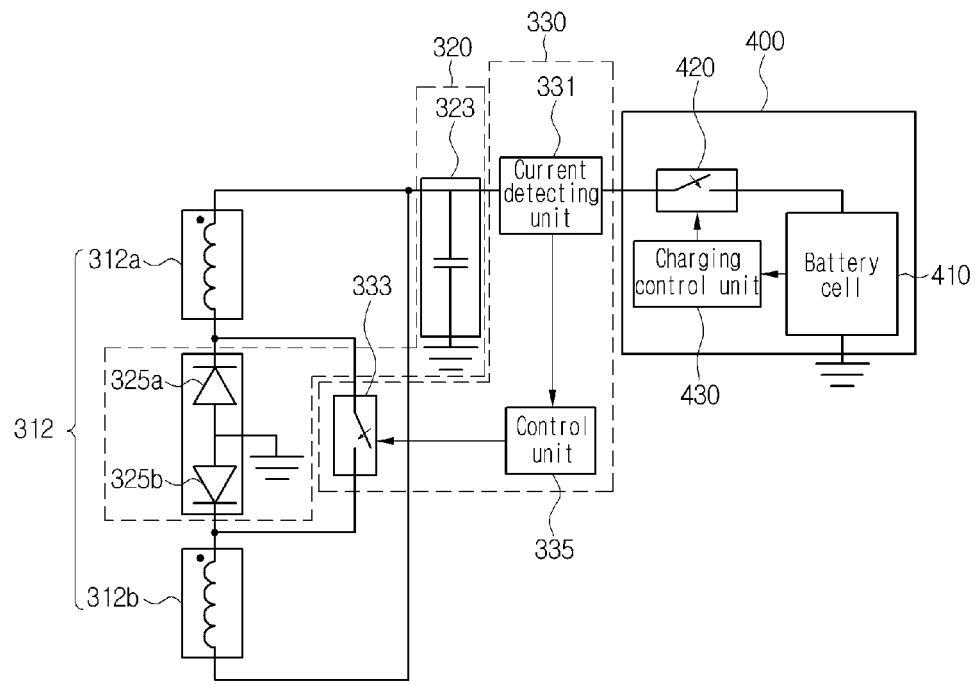
[Fig. 6]
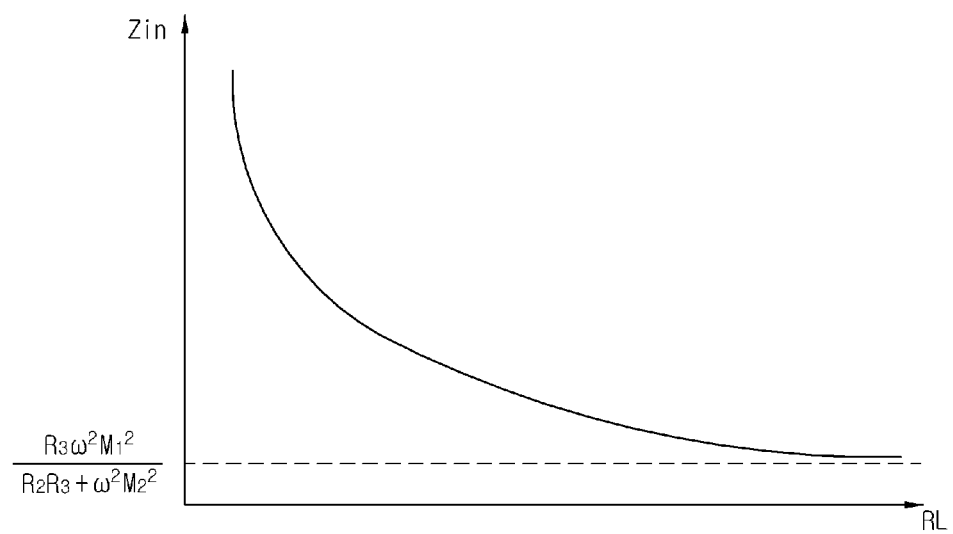

[Fig. 7]
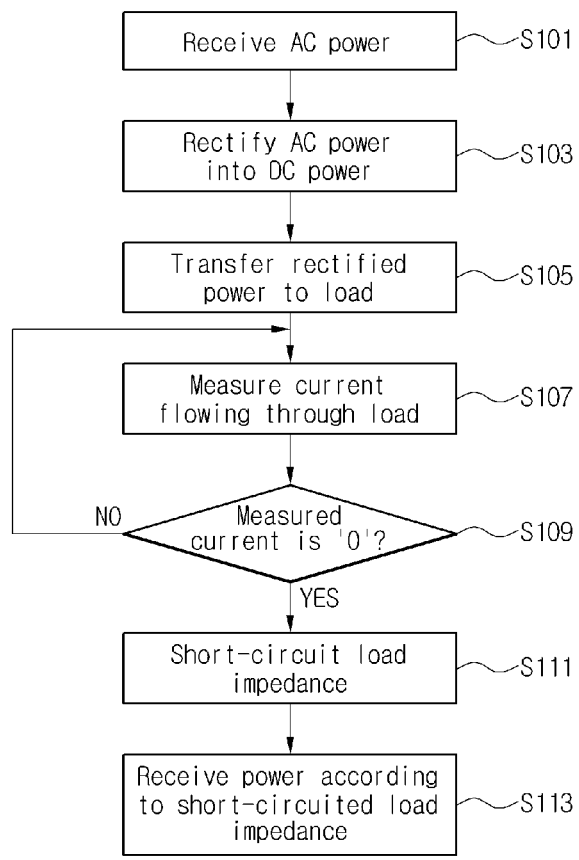

WIRELESS POWER RECEIVING DEVICE AND POWER CONTROL METHOD THEREOF

FIELD OF THE INVENTION

The embodiment relates to a wireless power transmission technology. More particularly, the embodiment relates to a wireless power receiving device capable of maximizing power transmission efficiency and a power control method thereof.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance thereof is short.

Until now, the long-distance transmission using the magnetic induction, the resonance and the short-wavelength radio frequency has been used as the wireless energy transfer scheme.

Recently, among the wireless power transmission technologies, an energy transfer scheme using resonance has been extensively used.

Since a wireless power transmission system based on resonance transmits electrical signals formed at transmitter and receiver sides through a coil in wireless, a user can easily charge an electronic device such as a portable device with electricity.

SUMMARY OF THE INVENTION

However, when the charging of the reception side is completed, the transmission side transmits the power without taking the fact into consideration, so that the power transmission efficiency is deteriorated.

The embodiment provides a wireless power receiving device capable of maximizing the power transmission efficiency between the wireless power transmitter and the wireless power receiver and a method of controlling power thereof.

The embodiment provides a wireless power receiving device capable of reducing the power transmitted to the wireless power receiver by adjusting the load impedance so that the power is prevented from being unnecessarily wasted and a method of controlling power thereof.

The embodiment provides a wireless power receiver which wirelessly receives power from a wireless power transmitter and transfers the power to a load. The wireless power receiver includes a reception unit to receive power from the wireless power transmitter by using a resonance scheme; a load management unit to control an impedance of the load according to a state of the load; and a rectifying unit disposed between the reception unit and the load management unit in order to rectify the received power, wherein the power transmitted from the wireless power transmitter is controlled by the controlled impedance.

The embodiment provides a method of controlling power of a wireless power receiver. The method includes transferring power wirelessly received from a wireless power transmitter to a load; identifying a state of the load; adjusting an impedance of the load according an identified state of the load; and receiving power of the wireless power transmitter controlled according to the adjusted impedance to transfer the power to the load.

According to the embodiment, the power transmission efficiency may be maximized between the wireless power transmitter and the wireless power receiver.

According to the embodiment, when the charging of the load is completed, the power transmitted to the wireless power receiver may be reduced by adjusting the load impedance, so that the power may be prevented from being unnecessarily wasted.

Meanwhile, any other various effects will be directly and implicitly described below in the description of the embodiment.

BRIEF DESCRIPTION OF THE DRAWINGS

FIG. 1 is a block diagram showing a power supply device 100 according to the embodiment.

FIG. 2 is a view showing a wireless power transmission system according to one embodiment.

FIG. 3 is a block diagram showing a wireless power receiver according to the embodiment.

FIG. 4 is a circuit diagram showing one example of the configuration of the wireless power receiver according to the embodiment.

FIG. 5 is a circuit diagram showing another example of the configuration of the wireless power receiver according to the embodiment.

FIG. 6 is a graph showing a relation between the load impedance and the input impedance of the wireless power transmitter.

FIG. 7 is a flow chart illustrating a method of controlling power of a wireless power receiver 300 according to the embodiment.

DETAILED DESCRIPTION OF THE EMBODIMENTS OF THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

Hereinafter the embodiment will be described with reference to accompanying drawings. The thickness and size of each layer shown in the drawings may be exaggerated, omitted or schematically drawn for the purpose of convenience or clarity. In addition, the size of elements does not utterly reflect an actual size.

FIG. 1 is a block diagram showing a power supply device 100 according to the embodiment.

Referring to FIG. 1, the power supply device 100 may include a power supply unit 110, a switch 120, a DC-DC converter 130, a current sensing unit 140, an oscillator 150, an AC power generating unit 160, a storage unit 170 and a control unit 180.

The power supply unit 110 may supply DC power to each component of the power supply device 100.

If the wireless power transmitter 200 transmits power to the wireless power receiver 300 through a resonance scheme according to the embodiment, the wireless power transmitter 200 may include a transmission induction coil unit 211 and a transmission resonant coil unit 212 to be described later. If the wireless power transmitter 200 transmits power to the wireless power receiver 300 by using the electromagnetic induction technology according to the embodiment, the wireless power transmitter 200 may not include the transmission resonant coil unit 212.

The switch 120 may electrically connect the power supply unit 110 to the DC-DC converter 130 or electrically disconnect the power supply unit 110 from the DC-DC converter 130.

The switch 120 may be open in response to an open signal of the control unit 180 or be shorted in response to a short signal of the control unit 180. Various types of switches may be used as the switch 120 according to the embodiment.

The DC-DC converter 130 may convert a first DC voltage, which is supplied from the power supply unit 110, into a second DC voltage and may output the second DC voltage.

After converting the first DC voltage output from the power supply unit 110 into AC voltage, the DC-DC converter 130 may boost up or drop down and rectify the AC voltage to generate the second DC voltage.

The DC-DC converter 130 may include a switching regulator or a linear regulator.

The linear regulator is a converter to receive input voltage to output a required quantity of voltage and to discharge the remaining quantity of voltage as heat.

The switching regulator is a converter capable of adjusting the output voltage through a pulse width modulation (PWM) scheme.

When the DC voltage output from the DC-DC converter 130 is applied to the AC power generating unit 160, the current sensing unit 140 may sense the current flowing between the DC-DC converter 130 and the AC power generating unit 160 and measure the intensity of the sensed current.

Since the current measured by the current sensing unit 140 flows into the wireless power transmitter 200 via the AC power generating unit 160, the current is proportional to the current input to the wireless power transmitter which will be described below. That is, as the current intensity measured by the current sensing unit 140 is increased or decreased, the current intensity input to the wireless power transmitter 200 may be increased or decreased.

According to one embodiment, the current sensing unit 140 may include a current transformer (CT).

According to one embodiment, the intensity of current applied to the AC power generating unit 160 may be utilized to find out the distance between the wireless power transmitter 200 and the wireless power receiver 300.

According to one embodiment, the intensity of current applied to the AC power generating unit 160 may be utilized to find out a coupling coefficient between the wireless power transmitter 200 and the wireless power receiver 300.

The current sensing unit 140 may transfer the signal corresponding to the intensity of the sensed current to the control unit 180.

Although the current sensing unit 140 is depicted in FIG. 1 as an element separated from the control unit 180, the current sensing unit 140 may be included in the control unit 180.

The oscillator 150 may generate an AC signal having a predetermined frequency. The AC signal generated from the oscillator 150 is applied to the AC power generating unit 160.

The AC power generating unit 160 may convert the DC voltage transferred from the DC-DC converter 130 into the AC voltage.

The AC power generating unit 160 may amplify the AC signal generated from the oscillator 150. A degree of amplifying the AC signal may be varied according to the DC voltage applied through the DC-DC converter 130.

According to one embodiment, the AC power generating unit 160 may include a push-pull type dual MOSFET.

The control unit 180 may control the overall operation of the power supply device 100.

The control unit 180 may control the DC-DC converter 130 so that preset DC voltage is applied to the AC power generating unit 160.

When the DC voltage output from the DC-DC converter 130 is applied to the AC power generating unit 160, the control unit 180 may receive a signal, which corresponds to the intensity of current flowing between the DC-DC converter 130 and the AC power generator 160, from the current sensing unit 140, and may adjust the DC voltage output from the DC-DC converter 130 and the frequency of the AC signal output from the oscillator 150 by using the received signal.

The control unit 180 receives the signal, which corresponds to the intensity of the current applied to the AC power generating unit 160, from the power transmission state detecting unit 140 to determine if the wireless power receiver 300 exists. In other words, the control unit 180 may determine the existence of the wireless power receiver 300 capable of receive power from the wireless power transmitter 200 based on the intensity of the current applied to the AC power generating unit 160.

As described below, the intensity of the current applied to the AC power generating unit 160 is proportional to that of the current input to the wireless power transmitter 200.

The control unit 180 may control the oscillator 150 such that an AC signal having a predetermined frequency is generated. The predetermined frequency may refer to a resonance frequency of the wireless power transmitter 200 and the wireless power receiver 300 when the power transmission is performed by using resonance.

The wireless power transmitter 200 receives the AC power from the AC power generating unit 160.

When the wireless power transmitter 200 transmits power to the wireless power receiver 300 through resonance, the wireless power transmitter 200 may include the transmission induction coil unit 211 and the transmission resonant coil unit 212 constituting a transmitting unit 210 shown in FIG. 2 described below.

When the wireless power transmitter 200 transmits power to the wireless power receiver 300 by using electromagnetic induction, the wireless power transmitter 200 may include only the transmission induction coil unit 211 of the transmitting unit 210 shown in FIG. 2 described below.

The transmission resonant coil unit 212 may transmit the received AC power to the wireless power receiver 300 by using resonance. In this case, the wireless power receiver 300 may include the reception resonant coil 310 and the reception induction coil 320 shown in FIG. 2.

Hereinafter a resonant type wireless power transmission system 10 according to the embodiment will be described.

FIG. 2 is a circuit diagram showing the resonant type wireless power transmission system 10 according to the embodiment.

Referring to FIG. 2, the wireless power transmission system 10 may include a power supply device 100, a wireless power transmitter 200, a wireless power receiver 300 and a load 400.

The power supply device 100 includes all components described with reference to FIG. 1, and the components basically include the functions described with reference to FIG. 1.

The wireless power transmitter 200 may include a transmitting unit 210 and a detecting unit 220.

The transmitting unit 210 may include a transmission induction coil unit 211 and a transmission resonant coil unit 212.

The power generated from the power supply device 100 is transmitted to the wireless power transmitter 200. The power received in the wireless power transmitter 200 is transmitted to the wireless power receiver 300 that makes resonance with the wireless power transmitter 200 due to a resonance phenomenon. The power transmitted to the wireless power receiver 300 may be transferred to the load 400 through a rectifier 320.

The load 400 may be a rechargeable battery or a device requiring DC power. In the embodiment, a load resistor of the load 400 is denoted as $R_L$. According to the embodiment, the load may be included in the wireless power transmitter 300.

The power supply device 100 may supply AC power having a predetermined frequency to the wireless power transmitter 200. The power supply device 100 may supply AC power having a resonance frequency at which the wireless power transmitter 200 resonates with the wireless power receiver 300.

The transmitting unit 210 may include a transmission induction coil unit 211 and a transmission resonant coil unit 212.

The transmission induction coil unit 211 is connected to the power supply device 100, such that AC current flows through the transmission induction coil unit 211 by the power provided from the power supply device 100. If the AC current flows through the transmission induction coil unit 211, corresponding AC current may be induced to the transmission resonant coil unit 212 physically spaced apart from the transmission induction coil unit 211 due to the electromagnetic induction. The power provided to the transmission resonant coil unit 212 is transmitted to the wireless power receiver 300, which makes a resonance circuit with the wireless power transmitter 200, through resonance.

Power can be transmitted between two LC circuits, which are impedance-matched with each other, through resonance. The power transmitted through the resonance can be farther transmitted with higher efficiency when comparing with the power transmitted by the electromagnetic induction.

The transmission resonant coil unit 212 of the wireless power transmitter 200 may transmit power to the reception resonant coil unit 311 of the wireless power receiver 300 through a magnetic field.

In detail, the transmission resonant coil unit 212 and the reception resonant coil unit 311 are magnetically resonantly coupled with each other to be operated at the resonant frequency.

Since the transmission resonant coil unit 212 is resonantly coupled with the reception resonant coil unit 311, the power transmission efficiency between the wireless power transmitter 200 and the wireless power receiver 300 can be significantly improved.

A quality factor and a coupling coefficient are important in the wireless power transmission.

The quality factor may refer to an index of energy that may be stored in the vicinity of the wireless power transmitter or the wireless power receiver.

The quality factor may be varied depending on the operating frequency "w as well as a shape, a dimension and a material of a coil. The quality factor may be expressed as following equation, $Q=w*L/R$. In the above equation, L refers to the inductance of a coil and R refers to resistance corresponding to the quantity of power loss caused in the coil.

The quality factor may have a value of 0 to infinity.

The coupling coefficient represents the degree of magnetic coupling between a transmission coil and a reception coil, and has a value in the range of 0 to 1.

The coupling coefficient may be varied depending on the relative position and distance between the transmission coil and the reception coil.

The transmission induction coil unit 211 may include a transmission induction coil L1 and a capacitor C1. In this case, the capacitance of the capacitor C1 is a value adjusted for the operation at the resonance frequency "w".

One terminal of the capacitor C1 is connected to one terminal of the power supply device 100, and the other terminal of the capacitor C1 is connected to one terminal of the transmission induction coil L1. The other terminal of the transmission induction coil L1 is connected to the other terminal of the power supply device 100.

The transmission resonant coil unit 212 includes a transmission resonant coil L2, a capacitor C2, and a resistor R2. The transmission resonant coil L2 includes one terminal connected to one terminal of the capacitor C2 and the other terminal connected to one terminal of the resistor R2. The other terminal of the resistor R2 is connected to the other terminal of the capacitor C2. The resistance of the resistor R2 represents the quantity of power loss in the transmission resonant coil L2, and the capacitance of the capacitor C2 is a value adjusted for the operation at the resonance frequency of "w".

The detecting unit 220 may measure input impedance Ziin. According to the embodiment, the input impedance Ziin may refer to an impedance when viewed from the power supply device 100 toward the wireless power transmitter 200.

The wireless power receiver 300 may include a reception unit 310, a rectifying unit 320 and a load management unit 330.

The wireless power receiver 300 may be embedded in an electronic appliance such as a cellular phone, a mouse, a laptop computer or an MP3 player.

The reception unit 310 may include a reception resonant coil unit 311 and a reception induction coil unit 312.

The reception resonant coil unit 311 includes a reception resonant coil L3, a capacitor C3, and a resistor R3. The reception resonant coil L3 includes one terminal connected to one terminal of the capacitor C3 and the other terminal connected to one terminal of the resistor R3. The other terminal of the resistor R3 is connected to the other terminal of the capacitor C3. The resistance of the resistor R3 represents the quantity of power loss in the transmission resonant coil L3, and the capacitance of the capacitor C3 is a value adjusted for the operation at the resonance frequency "w".

The reception induction coil unit 312 includes a reception induction coil L4 and a capacitor $C_4$. The reception resonant coil L4 includes one terminal connected to one terminal of the capacitor $C_4$. The other terminal of the reception induction coil $L_4$ is connected to the other terminal of the rectifying unit 320. The other terminal of the capacitor $C_4$ is connected to one terminal of the rectifying unit 320.

The reception resonant coil unit 311 and the transmission resonant coil unit 212 maintain a resonance state at a resonance frequency. In other words, the reception resonant coil unit 311 and the transmission resonant coil unit 212 are resonance-coupled with each other so that AC current flows through the reception resonant coil unit 311. Accordingly, the reception resonant coil unit 311 may receive power from the wireless power transmitter 200 through a non-radiative scheme.

The reception induction coil unit 312 receives power from the reception resonant coil unit 311 through the electromagnetic induction, and the power received in the reception induction coil unit 312 is rectified by the rectifying unit 320 and sent to the load 400.

The rectifying unit 320 may receive the AC power from the reception induction coil unit 312 and convert the received AC power into DC power.

The rectifying unit 320 may include a rectifying circuit (not shown) and a smoothing circuit (not shown).

The rectifying circuit may include a diode and a capacitor to convert the AC power received from the reception induction coil unit 312 to DC power and sent the DC power to the load 400.

The smoothing circuit may smooth the rectified output. The smoothing circuit may include a capacitor, but the embodiment is not limited thereto.

The load management unit 330 may receive the rectified DC power from the rectifying unit 320 and may provide the rectified DC power to the load 400. Details of the load management unit 330 will be described below.

The load 400 may be a predetermined rechargeable battery or device requiring the DC power. According to the embodiment, the load 400 may refer to a battery of a cellular phone, but the embodiment is not limited thereto.

Although the load 400 separated from the wireless power receiver 300 is depicted in the drawings, according to one embodiment, the load 400 may be included in the wireless power receiver 300.

The wireless power receiver 300 may be mounted on an electronic appliance, such as a cellular phone, a laptop computer or a mouse, requiring power.

FIG. 3 is a block diagram showing a wireless power receiver according to the embodiment. FIG. 4 is a circuit diagram showing one example of the configuration of the wireless power receiver according to the embodiment. FIG. 5 is a circuit diagram showing another example of the configuration of the wireless power receiver according to the embodiment.

Referring to FIGS. 2 to 4, a load 400 may include a battery cell 410, a switch 420 and a charging control unit 430.

The load 400 may include a battery for driving an electronic appliance, but the embodiment is not limited thereto.

The battery cell 410 may receive power from the wireless power receiver 300 and may drive an electronic appliance by using the power supplied from the wireless power receiver 300. The battery cell 410 may refer to a unit of battery constituting a battery pack.

The switch 420 is open or shorted according to a control of the charging control unit 430 described below so that the power supplying to the battery cell 410 may be maintained or blocked.

The charging control unit 430 may control an overall operation of the load 400.

The charging control unit 430 may identify the charged state of the battery cell 410 so that the operation of the switch may be controlled.

In detail, when the charging of the battery cell 410 is completed, the charging control unit 430 may transfer an opening signal to the switch 420 to open the switch 420, such that the power supply to the battery cell 410 may be blocked. When the charging of the battery cell 410 is not completed, the charging control unit 430 may transfer a shorting signal to the switch 420 to short the switch 420, such that the power supply to the battery cell 410 may be maintained.

A wireless power receiver 300 may include a receiving unit 310, a rectifying unit 320 and a load management unit 330.

The receiving unit 310 may include a reception resonant coil unit 311 and a reception induction coil unit 312, as described in FIG. 2.

The rectifying unit 320 may rectify the AC power received from the receiving unit 310 to generate DC power and may transfer the DC power to the load management unit 330. If describing a configuration example of the rectifying unit 320, the rectifying unit 320 may include a rectifier 321 and a smoothing circuit 323.

The rectifier 321 may rectify the AC power received from the reception induction coil unit 312 to generate the DC power. According to the embodiment, as shown in FIG. 4, a diode may be used as the rectifier 321.

The smoothing circuit 323 may smooth the DC power generated from the rectifier 321. According to the embodiment, as shown in FIG. 4, a capacitor may be used as the smoothing circuit 323. One terminal of the capacitor is connected to an output terminal of the diode as the rectifier 321 and the other terminal of the capacitor may be connected to one terminal of the reception induction coil unit 312. That is, the capacitor may be connected in parallel to a reception induction coil L4 of the reception induction coil unit 312.

As shown in FIG. 5, the rectifying unit 320 may be configured.

Referring to FIG. 5, the wireless power receiver 300 may include a reception induction coil unit 312, a rectifying unit 320 and a load management unit 330.

The reception induction coil unit 312 may include first and second reception induction coils 312a and 312b.

The rectifying unit 320 may include first and second rectifying diodes 325a and 325b, and a smoothing circuit 323.

The smoothing circuit 323 is the same as that described in FIG. 4.

The first and second reception induction coils 312a and 312b may receive the power from the reception resonant coil 311 through electromagnetic induction, respectively.

The rectifying unit 320 transfers the power received from the reception induction coil unit 312 to the load 400.

The first rectifying diode 325a may allow the AC current to flow out or be cut off according to polarity of the AC current applied to the first reception induction coil 312a. According to the characteristic of a rectifying diode, the current flows in only one direction according to the polarity of AC current.

For example, when the polarity of the AC current applied to the first rectifying diode 325a is positive, the first rectifying diode 325a outputs the current. When the polarity of the AC current applied to the first rectifying diode 325a is negative, the first rectifying diode 325a blocks the current. When the current flow is blocked due to the change of the current polarity, the resistance of the rectifying diode is increased so that the rectifying diode is operated as an open circuit.

Like the first rectifying diode 325a, the second rectifying diode 325b may allow the AC current to flow out or be cut off according to the polarity of the AC current applied to the second induction coil 312b.

Referring again to FIG. 3, the load management unit 330 may provide the DC power received from the rectifying unit 320 to the load 400.

The load management unit 330 may include a current detecting unit 331, an impedance varying unit 333 and a control unit 335.

The current detecting unit 331 may measure the current provided to the load 400, that is, the battery cell 410. According to the embodiment, the current detecting unit 331 may use a current sensor, but the embodiment is not limited thereto.

The impedance varying unit 333 may adjust the impedance of the load 400 according to the current measured by the current detecting unit 331, so that the input impedance Ziin of the wireless power transmitter 200 may be changed. When the input impedance Ziin of the wireless power transmitter 200 is changed, the transmission power transferred from the wireless power transmitter 200 to the wireless power receiver 300 may be changed. This will be described below.

As shown in FIG. 4, according to the embodiment, a switch may be used as the impedance varying unit 333. The switch may be connected in parallel to the capacitor 323. One terminal of the switch may be connected between one terminal of the capacitor 323 and the current detecting unit 331 and the other terminal of the switch may be connected to the other terminal of the capacitor 323.

The control unit 335 may control an overall operation of the load management unit 330.

The control unit 335 may control the operation of the impedance varying unit 333 by using the current measured by the current detecting unit 331. In detail, when the measured current is 0 (zero), the control unit 335 may transfer a shorting signal to the impedance varying unit 333. When the measured current is not 0 (zero), the control unit 335 may transfer an opening signal to the impedance varying unit 333.

Hereinafter the operation of changing the input impedance of the wireless power transmitter 200 by controlling the impedance $R_L$ of the load 400 and adjusting the power transferred from the wireless power transmitter 200 to the wireless power receiver 300 according to the changed input impedance will be described.

First, the process of obtaining the input impedance Ziin of the wireless power transmitter 200 will be described with reference to FIG. 2.

Impedance Z1 is an impedance when the reception induction coil unit 312 is viewed from the reception resonant coil unit 311, and may be expressed as following Equation 1:

$$Z_1 = \frac{\omega^2 M_3^2}{R_L} \quad \text{[Equation 1]}$$

Wherein "w" is a resonance frequency at which the transmission resonant coil L2 resonates with the reception resonant coil L3, and M3 refers to the mutual inductance between the reception resonant coil L3 and the reception induction coil L4. In addition, $R_L$ is an impedance of the load 400.

Equation 1 is expressed in frequency domain, and the following equations will be expressed in frequency domain.

Impedance Z2, which is the complex impedance of a resistor R3 representing a power loss of the reception induction coil L3 and impedance Z1, may be expressed as Equation 2:

$$Z_2 = R_3 + Z_1 = R_3 + \frac{\omega^2 M_3^2}{R_L} = \frac{R_3 R_L + \omega^2 M_3^2}{R_L} \quad \text{[Equation 2]}$$

Impedance Z3, which is the impedance when the reception resonant coil unit 311 is viewed from the transmission resonant coil unit 212, may be expressed as following Equation 3:

$$Z_3 = \frac{\omega^2 M_2^2}{Z_2} = \frac{\omega^2 M_2^2 R_L}{R_3 R_L + \omega^2 M_3^2} \quad \text{[Equation 3]}$$

Wherein "w" is a resonance frequency at which the transmission resonant coil L2 resonates with the reception resonant coil L3, and M2 refers to the mutual inductance between the transmission resonant coil L2 and the reception resonant coil L3.

Impedance Z4, which is the complex impedance of a resistor R2 representing a power loss of the transmission resonant coil L2 and impedance Z3, may be expressed as Equation 4:

$$Z_4 = R_2 + Z_3 \quad \text{[Equation 4]}$$
$$= R_2 + \frac{\omega^2 M_2^2 R_L}{R_3 R_L + \omega^2 M_3^2}$$
$$= \frac{R_2 R_3 R_L + \omega^2 M_3^2 R_2 + \omega^2 M_2^2 R_L}{R_3 R_L + \omega^2 M_3^2}$$

Impedance Z5, which is the impedance when the transmission induction coil unit 212 is viewed from the transmission resonant coil unit 211, may be expressed as following Equation 5:

$$Z_5 = \frac{\omega^2 M_1^2}{Z_4} = \frac{\omega^2 M_1^2 (R_3 R_L + \omega^2 M_3^2)}{R_2 R_3 R_L + \omega^2 M_3^2 R_2 + \omega^2 M_2^2 R_L} \quad \text{[Equation 5]}$$

Wherein "w" is a resonance frequency at which the transmission resonant coil L2 resonates with the reception resonant coil L3, and M1 refers to the mutual inductance between the transmission resonant coil L1 and the transmission induction coil L2.

Impedance Ziin is the input impedance when the wireless power transmitter 200 is viewed from the power supply device 100. If the inductance of the transmission induction coil L1 and the capacitance of the capacitor C1 are controlled to be operated at resonance frequency "w", impedance Ziin may be equal to impedance Z5. That is, impedance Ziin may be expressed as following Equation 6:

$$Ziin = Z_5 \qquad \text{[Equation 6]}$$

Meanwhile, when load impedance $R_L$ has an infinity value, input impedance Ziin may be expressed as following Equation 7:

$$Z_{iin} = \frac{R_3 \omega^2 M_1^2}{R_2 R_3 + \omega^2 M_2^2} \qquad \text{[Equation 7]}$$

When impedance $R_L$ of the load 400 has an infinity value, the infinity value may refer to the state that the charging of the battery cell 410 is completed so that the switch 420 is open.

A relation graph between input impedance Ziin of the wireless power transmitter 200 and load impedance $R_L$ using Equations 5 and 6 may be depicted as shown in FIG. 6.

FIG. 6 is a graph showing a relation between the load impedance and the input impedance of the wireless power transmitter.

Referring to FIG. 6, as load impedance $R_L$ is increased, input impedance Ziin is decreased. It may be known that input impedance Ziin is increased as load impedance $R_L$ is decreased. In other words, as load impedance $R_L$ is decreased, input impedance Ziin may be exponentially increased.

While a constant voltage is applied to the wireless power transmitter 200, if input impedance Ziin is increased, the current input to the wireless power transmitter 200 may be decreased and the power transmitted from the wireless power transmitter 200 to the wireless power receiver 300 may be decreased according to the power relation formula of P=VI.

To the contrary, while a constant voltage is applied to the wireless power transmitter 200, if input impedance Ziin is decreased, the current input to the wireless power transmitter 200 may be increased and the power transmitted from the wireless power transmitter 200 to the wireless power receiver 300 may be increased according to the power relation formula of P=VI.

That is, if input impedance Ziin is decreased, the power transmitted from the wireless power transmitter 200 to the wireless power receiver 300 may be increased. If input impedance Ziin is increased, the power transmitted from the wireless power transmitter 200 to the wireless power receiver 300 may be decreased.

If the charging of the battery cell 410 is completed so that the switch 420 of the load 400 is open, load impedance $R_L$ has an infinity value. In this case, as shown in FIG. 6, input impedance Ziin is decreased so that input impedance Ziin may be expressed as Equation 7. If input impedance Ziin is decreased, although the charging of the battery cell 410 is completed, the transmission power is increased so that power is unnecessarily consumed.

Thus, in order to prevent the unnecessary power consumption even though the charging of the battery cell 410 is completed, a method of increasing input impedance Ziin by reducing load impedance $R_L$ at the maximum is required.

Load impedance $R_L$ of the load 400 may be controlled by the load management unit 330. In detail, referring to FIG. 4, when the charging of the battery cell 410 is completed, the charging control unit 430 may allow the switch 420 to be open.

When the switch 420 is open, the current measured by the current detecting unit 331 becomes 0 (zero) and the control unit 335 transmits the shorting signal to the impedance varying unit 333.

When a switch is used as the impedance varying unit 333, the switch 333 is switched on according to the shorting signal received from the control unit 335. Then, impedance $R_L$ of the load 400 becomes 0Ω.

The impedance varying unit 333 may be operated inersely to the switch 420. For example, when the switch 420 is switched off, the impedance varying unit 333 may be shorted. For example, when the switch 420 is switched on, the impedance varying unit 333 may be open.

When the impedance of the load 400 becomes 0Ω, as shown in the graph of FIG. 6, input impedance Ziin of the wireless power transmitter 200 may be very great. When the constant voltage is applied to the wireless power transmitter 200, input impedance Ziin of the wireless power transmitter 200 may be very great so that the current input to the wireless power transmitter 200 may be decreased. If the current input to the wireless power transmitter 200 is decreased, the power transmitted from the wireless power transmitter 200 to the wireless power receiver 300 may be reduced according to the power relation formula of P=VI.

That is, when the charging of the load 400 is completed, the wireless power receiver 300 may control such that impedance $R_L$ of the load 400 is 0Ω and the transmission power is reduced, so the power is prevented from being unnecessarily provided to the load 400.

Thus, the power transmission efficiency between the wireless power transmitter 200 and the wireless power receiver 300 may be very improved.

Hereinafter a method of controlling power of the wireless power receiver 300 according to the embodiment will be described in connection with FIGS. 1 to 6.

FIG. 7 is a flow chart illustrating a method of controlling power of a wireless power receiver 300 according to the embodiment.

First, in step S101, the receiving unit 310 of the wireless power receiver 300 receives AC power from the transmitting unit 210 of the wireless power transmitter 200. The receiving unit 310 may receive the power from the transmitting unit 210 by using resonance.

In step S103, the rectifying unit 320 of the wireless power receiver 300 rectifies the received AC power to generate DC power.

In step S105, the load management unit 330 transfers the rectified DC power to the load 400.

In step S107, the current detecting unit 331 measures the current flowing into the load 400 while the DC power is being transferred to the load 400.

In the step S109, the control unit 335 of the load management unit 330 identifies whether the measured current is 0 (zero).

In the embodiment, the current flowing into the load 400 is measured in order to identify whether the charging of the battery cell 410 of the load 400 is completed. That is, when the current flowing into the load 400 is 0 (zero), it may be identified that the charging of the battery cell 410 is completed.

If the measured current is 0 (zero), the control unit 335 of the load management unit 330 transmits the shorting signal to the impedance varying unit 333 to allow load impedance $R_L$ to be shorted in the step S111. A switching device may be used as the impedance varying unit 333 and load impedance $R_L$ may have 0Ω or a value approximate to 0Ω.

When load impedance $R_L$ may have 0 Ω or a value approximate to 0Ω as shown in the graph of FIG. 6, input impedance Ziin of the wireless power transmitter 200 may be very great. When input impedance Ziin of the wireless power transmitter 200 may be very great, if a constant voltage is applied to the wireless power transmitter 200, the current input to the wireless power transmitter 200 may be decreased.

Thus, the power transmitted from the wireless power transmitter 200 to the wireless power receiver 300 may be decreased according to the power relation formula of P=VI.

In step S113, the receiving unit 310 receives the power corresponding to the short-circuited load impedance from the transmitting unit 210 of the wireless power transmitter 200. That is, when the charging of the battery cell 410 is completed, the wireless power receiver 300 may receive the reduced power so that the power is prevented from being unnecessarily wasted.

The method of controlling power according to the embodiment may be realized in the form of a program executed in a computer and stored in a computer-readable medium. The computer-readable recording medium includes a ROM, a RAM, a CD-ROM, a magnetic tape, a floppy disk, and an optical data storage device. Further, the computer-readable recording medium may be implemented in the form of a carrier wave (for example, transmission through Internet).

The computer-readable recording medium may be distributed in computer systems connected with each other through a network and a code which is readable by a computer in a distribution scheme may be stored and executed in the computer-readable recording medium. A functional program, a code and code segments for implementing the method may be easily deduced by programmers skilled in the related art.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The wireless power receiver according to the embodiment may be applied to an electronic appliance such as a mobile device, a mouse, a laptop computer or an MP3 player.

The invention claimed is:

1. A wireless power receiver which wirelessly receives power from a wireless power transmitter and transfers the power to a load, the wireless power receiver comprising:
  a reception unit to receive power from the wireless power transmitter by using a resonance scheme;
  a load management unit to control an impedance of the load according to a state of the load; and
  a rectifying unit disposed between the reception unit and the load management unit in order to rectify the received power,
  wherein the power transmitted from the wireless power transmitter is controlled by the controlled impedance,
  wherein the load management unit includes an impedance varying unit which controls the load impedance according to the state of the load,
  wherein the impedance varying unit includes a first switch device,
  wherein the first switch device is shorted so that the load impedance becomes 0Ω,
  wherein the reception unit includes a first reception induction coil and a second reception induction coil,
  wherein the rectifying unit includes a first rectifying diode, a second rectifying diode and a capacitor,
  wherein the first rectifying diode allows AC current to flow out or be cut off according to a polarity of the AC current applied to the first reception induction coil,
  wherein the second rectifying diode allows AC current to flow out or be cut off according to the polarity of the AC current applied to the second induction coil,
  wherein the capacitor is connected in parallel to the first reception induction coil,
  wherein the capacitor is connected in parallel to the second reception induction coil, and
  wherein one terminal of the first switch device is connected to an output terminal of the first rectifying diode, and the other terminal of the first switch device is connected to an output terminal of the second rectifying diode.

2. The wireless power receiver of claim 1, wherein the state of the load includes a charged state of the load.

3. The wireless power receiver of claim 1, wherein the load includes a second switch device for maintaining or blocking the power supplied from the reception unit.

4. The wireless power receiver of claim 3, wherein, when the second switch device is open, supply of the power is blocked.

5. The wireless power receiver of claim 4,
  when the second switch device is open, the load management unit controls such that the load impedance having the infinite value has a minimum value.

6. The wireless power receiver of claim 5, wherein the minimum value is 0Ω.

7. The wireless power receiver of claim 3, wherein the first switch device is operated oppositely to the second switch device.

8. The wireless power receiver of claim 7, wherein, when the load has been charged, the second switch device is open and the first switch device is shorted.

9. The wireless power receiver of claim 1, wherein the load management unit further includes:
  a current detecting unit connected between the rectifying unit and the load to detect a current flowing through the load; and
  a control unit to control the impedance varying unit according to a detected current by the current detecting unit.

10. The wireless power receiver of claim 9, wherein, when the second switch device is open to block the power supply, the control unit provides an opening signal to the impedance varying unit in response to a value of 0 (zero) detected from the current detecting unit in order to allow the load impedance to be adjusted to 0Ω.

11. The wireless power receiver of claim 1, wherein an input impedance of the wireless power transmitter is inversely proportional to the load impedance.

12. A method of controlling power of a wireless power receiver, the method comprising:
  transferring power wirelessly received from a wireless power transmitter to a load;
  identifying a state of the load;
  adjusting an impedance of the load according an identified state of the load; and receiving power of the wireless power transmitter controlled according to the adjusted impedance to transfer the power to the load, wherein the identifying of the state of the load is performed by detecting a current flowing through the load, wherein the adjusting of the impedance of the load includes controlling the impedance of the load to 0Ω when the current flowing through the load becomes 0 (zero), wherein a load management unit includes an impedance varying unit which controls the load impedance according to the state of the load, wherein the impedance varying unit includes a first switch device, wherein the first switch device is shorted so that the load impedance becomes 0Ω, wherein a reception unit includes a first reception induction coil and a second reception induction coil, wherein a rectifying unit includes a first rectifying diode, a second rectifying diode and a capacitor, wherein the first rectifying diode allows AC current to flow out or be cut off according to a polarity of the AC current applied to the first reception induction coil, wherein the second rectifying diode allows AC current to flow out or be cut off according to the polarity of the AC current applied to the second induction coil, wherein the capacitor is connected in parallel to the first reception induction coil, wherein the capacitor is connected in parallel to the second reception induction coil, and wherein one terminal of the first switch device is connected to an output terminal of the first rectifying diode, and the other terminal of the first switch device is connected to an output terminal of the second rectifying diode.

13. The method of claim 12, further comprising:

maintaining or blocking the power supplying to the load, wherein, when the power supplying to the load is blocked, the load impedance is controlled to be 0Ω.

* * * * *